United States Patent [19]

Holliday

[11] Patent Number: 4,805,019
[45] Date of Patent: Feb. 14, 1989

[54] NON-CONTACT APPARATUS AND METHOD FOR MEASURING THE LENGTH OF ALUMINUM SHEET AND PLATE

[75] Inventor: William H. Holliday, Richmond, Va.

[73] Assignee: Reynolds Metals Company, Richmond, Va.

[21] Appl. No.: 95,285

[22] Filed: Sep. 10, 1987

[51] Int. Cl.⁴ .............................................. H04N 7/18
[52] U.S. Cl. ..................................... 358/107; 358/101
[58] Field of Search ............... 358/107, 101, 106, 903;
382/8; 364/562; 356/383–386

[56] References Cited

U.S. PATENT DOCUMENTS

| 3,428,817 | 2/1969 | Hofmeister et al. | |
| 3,676,652 | 7/1972 | Millis, Jr. et al. | |
| 3,714,393 | 1/1973 | Johnson et al. | |
| 4,204,224 | 5/1980 | Buken et al. | 358/107 |
| 4,335,439 | 6/1982 | St. Denis | 364/562 |
| 4,384,303 | 5/1983 | Brenke et al. | 358/107 |
| 4,393,401 | 7/1983 | Gorenflo et al. | 358/107 |
| 4,476,533 | 10/1984 | Daudt et al. | 364/473 |
| 4,691,231 | 9/1987 | Fitzmorris et al. | 358/107 X |

FOREIGN PATENT DOCUMENTS

| 57-128809 | 8/1982 | Japan . |
| 59-91586 | 5/1984 | Japan . |
| 60-169704 | 9/1985 | Japan . |
| 0148529 | of 1962 | U.S.S.R. . |
| 1305152 | 1/1973 | United Kingdom . |

OTHER PUBLICATIONS

"News in Brief", ASEA Journal, vol. 52, No. 5, 1979, p. 152.
"Computer-Controlled Laser Beams in Object Dimension Measurements" Johansson, Falt and Eng, Optical Engineering, vol. 18 No. 4, pp. 384–386, Jul–Aug. 1979.

Primary Examiner—Howard W. Britton
Assistant Examiner—Victor R. Kostak
Attorney, Agent, or Firm—Alan M. Biddison

[57] ABSTRACT

An apparatus and method for measuring the length and/or width of a piece of material, such as hot aluminum plate. The apparatus has a measuring range defined by a plurality of cameras. A video screen is selectively connectable to the cameras to depict their viewing ranges. The apparatus, after an operator has aligned an indicator with a depicted edge of material, automatically calculates the distance of the depicted edge from a fixed point, such as the centerline of a shear.

13 Claims, 3 Drawing Sheets

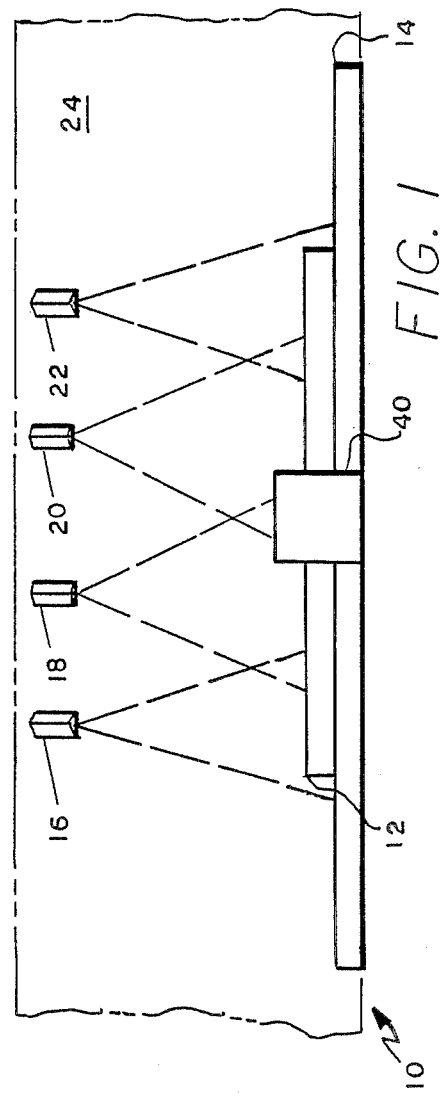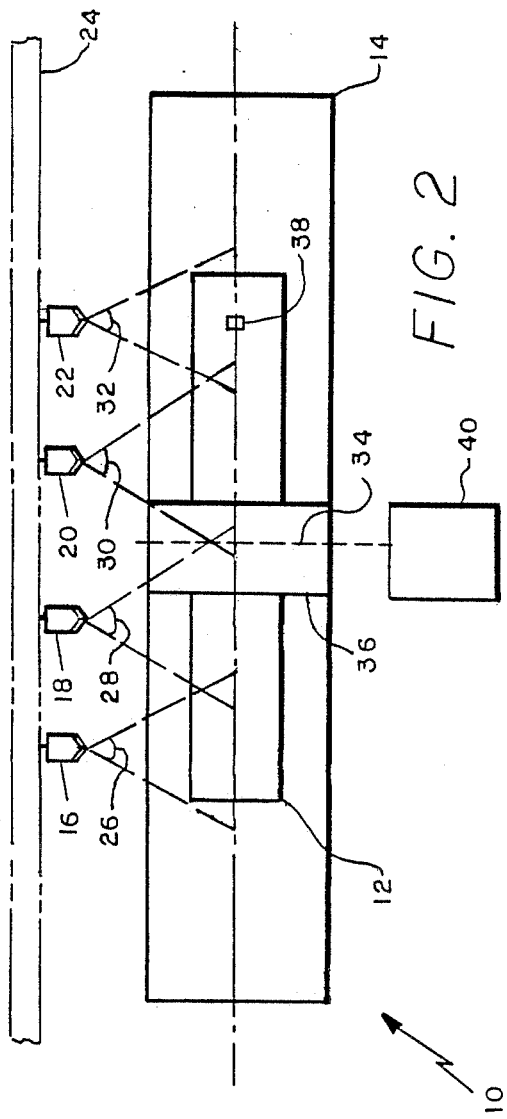

NON-CONTACT APPARATUS AND METHOD FOR MEASURING THE LENGTH OF ALUMINUM SHEET AND PLATE

BACKGROUND OF THE INVENTION

This invention relates to a method and apparatus for the non-contact measurement of a dimension of a piece of material. More particularly, the invention provides an apparatus and method for measuring the length or width of a piece of aluminum sheet or plate.

Numerous systems are known for measuring the length of a piece of material, such as hot aluminum sheet or plate. All of the known systems have disadvantages when compared with the system provided by the present invention.

One type of system requires strict control of lighting. Such system is difficult to use with aluminum because of the spectral characteristics of aluminum sheet and plate and the possibility of false readings because of surface defects and lubricant residues. There are high initial installation costs and continuous maintenance requirements, especially with installations designed to measure distances between a few feet and 150 feet.

Another type of measurement system utilizes a contact member designed to roll on the material being measured. A problem with this type of system is slippage because of lubricants on the materials being measured. In addition, it is difficult to obtain materials to use with hot aluminum plate (approximately 800° F.).

Another type of measurement system requires close proximity installation to the material being measured. The problem with a system of this type is the frequency of accidents associated with the measurement of aluminum plate. Plates occasionally fall off of a conveyor, for instance when the plate momentarily adheres to a roller feeding the plate to the measuring installation. Varying shapes of plate ends, such as "alligatoring", also make such close installations impractical.

Low resolution measurement systems also are difficult to use with aluminum because of the need for multiple sensors to read length, which results in high initial installation costs to ensure adequate resolution along a 150-foot long system. The upkeep and maintenance of such a system would also be extremely expensive.

Systems also are known relying on the measurement of speed. These systems read product speed and integrate to obtain the length. Such systems are inappropriate for long lengths and require extremely close monitoring of speed. This system also is difficult and time consuming to use because of the need to run the plate back and forth under a speed sensor to obtain desired measurements.

Still another type of measurement system measures a relatively short range and adds it to a known length. Because of the need for measuring consistently plate lengths that may vary between 6 feet and 160 feet, such system is impractical in the present situation. Such system would require a different setup for each measurement because of the relatively small measurement range. In addition, a system of this type must be relatively near the conveyor which would subject it to possible damage by plate falling off the conveyor.

Still another type of measurement system utilizes a moving camera to obtain measurements. This system requires a substantially continuous track that is installed either adjacent to the conveyor or on a wall. The system would be extremely unwieldy electrically and mechanically for a 160 foot measurement range and would require long measurement times because of the distances to be traveled. In addition, problems could be encountered with ensuring consistent calibration of such a system.

A final type of system equalizes a combination of temperatures and camera saturation. When measuring steel, a plurality of heat sensors are positioned along the measurement range and are combined with camera saturation. Similar temperature measurement of aluminum is difficult, relatively inaccurate, and hard to keep in calibration.

SUMMARY OF THE INVENTION

The present invention provides a non-contact measuring apparatus for measuring elongate pieces of material, such as pieces of aluminum sheet and plate. The apparatus has the capability of consistently measuring varying plate lengths between approximately 6 feet and approximately 160 feet.

The apparatus provided by the present invention includes a conveyor for positioning the material to be measured within a measuring range of the apparatus, a plurality of rigidly mounted cameras spaced from the conveyor and having viewing ranges defining the measuring range of the apparatus, means for calibrating the viewing ranges of the cameras so that they cover portions of known length of the measuring range, a video screen for displaying at least a portion of the viewing range of a selected one of the cameras, an indicator moveable with respect to the screen for indicating the edge of material to be measured, means using the position of the indicator to calculate the distance of an edge of the material from a fixed point, and alignment means operable by an operator of the apparatus to align the indicator with the edge.

One of the features of the present invention is the use of an operator to perform a measurement operation. While automatic systems have been developed to sense the edge of materials being measured, such systems have proven unreliable with aluminum because of the spectral characteristics of aluminum, the possibility of false readings because of surface contaminants on the aluminum, and the possibility of surface defects in the aluminum affecting sensing.

Another important feature of the present invention is the use of a plurality of fixedly mounted cameras to perform the measuring operation. The cameras are horizontally and vertically spaced from the conveyor so that they will not be injured by material falling off of the conveyor. Maintenance requirements are minimized because there is no need to maintain a track or other guide surface in the adverse environment associated with the rolling of hot aluminum. Rigid mounting of the cameras greatly facilitates their alignment with the conveyor. The speed of the measuring operation is increased because there is no need to wait for mechanical movement of a sensing device. Use of a plurality of cameras allows an effective measuring range of a few feet up to 160 feet or more.

With the method provided by the present invention, a piece of material to be measured is moved into the measuring range of the apparatus. The operator selects a camera having an edge of the material within its viewing range. This automatically connects the selected camera to the video display. The operator then moves the indicator into alignment with the displayed edge of the material. When the operator is satisfied that the indicator is in alignment, he gives an appropriate signal and the apparatus, based on the position of the indicator, automatically calculates the distance of the edge from a fixed point. The total length of the piece of material is obtained by performing a similar operation on the opposite edge of the material. Depending on the location of the edge with respect to the fixed point, the measured values are either subtracted or added to obtain the overall length.

The invention, and its objects and advantages, will become more apparent from the following description of preferred embodiments.

BRIEF DESCRIPTION OF THE DRAWINGS

In the detailed description of the preferred embodiments of the invention hereinafter presented, reference is made to the drawings, in which:

FIG. 1 is a schematic front elevational view of one embodiment of an apparatus in accordance with the present invention;

FIG. 2 is a schematic top plan view of the apparatus of FIG. 1;

DESCRIPTION OF THE PREFERRED EMBODIMENTS

Figure 3:
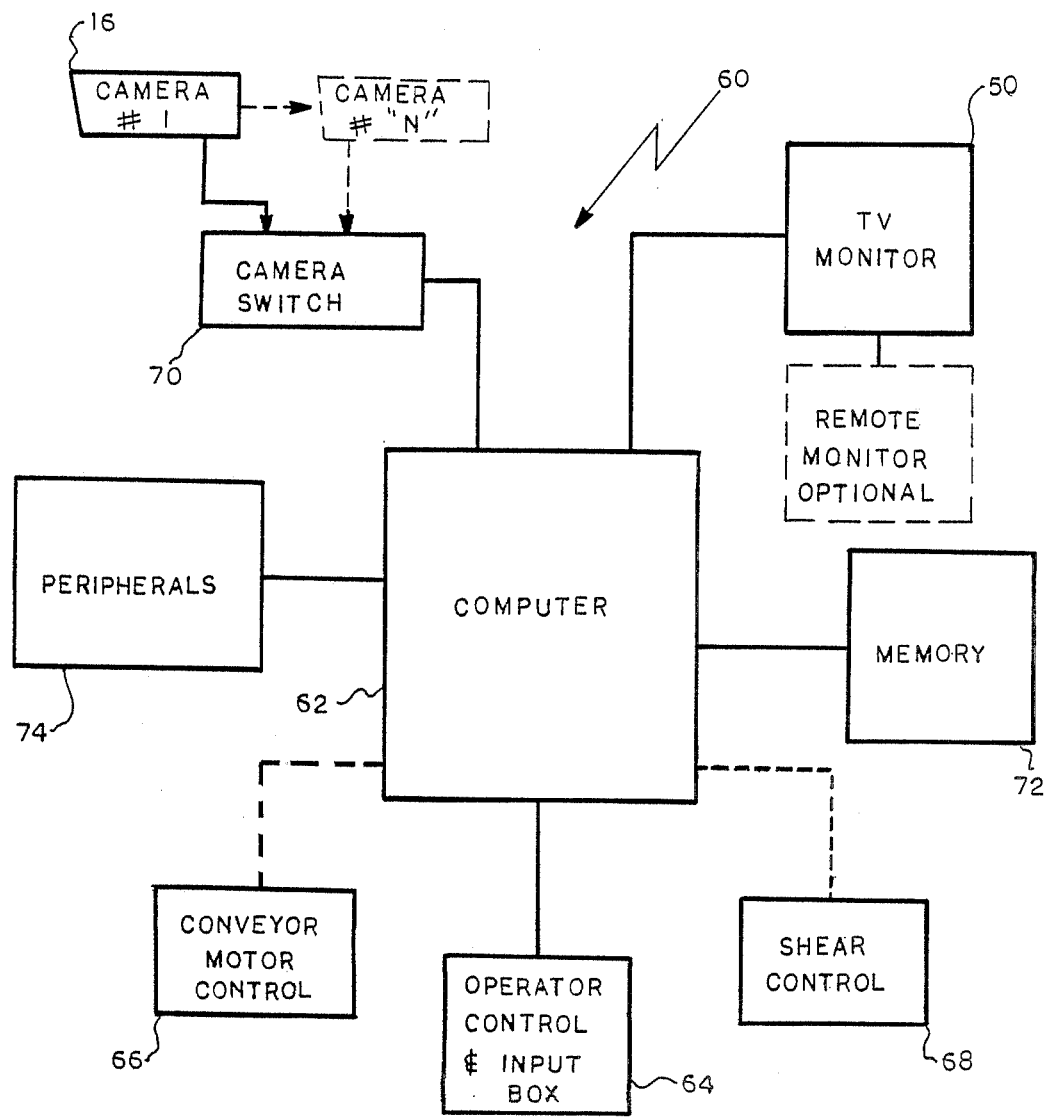
FIG. 3 is a schematic representation of one embodiment of a control system used with the present invention.

The present description will be directed in particular to elements forming part of, or cooperating more directly with, preferred embodiments of the present invention. Elements not specifically shown or described herein are understood to be selectable from those known in the art.

Referring now to the drawings, and to FIGS. 1 and 2 in particular, one embodiment of a measuring apparatus according to the present invention is illustrated. The apparatus, which is generally designated 10, is designed to measure a dimension of an elongate piece of material 12. In the illustrated embodiment, the apparatus 10 is designed to measure the length of the material; however, the apparatus also could be used to measure the width of the material. The material can take any form, such as aluminum sheet or plate. The invention is especially useful in measuring the length of aluminum plate or sheet exiting from a hot mill. Such sheet or plate normally has a temperature in the vicinity of 800° F.

The apparatus includes a conveyor 14 for positioning the material 12 within the measuring range of the apparatus. The conveyor, in the illustrated embodiments, is a conventional conveyor that has individually powered rollers that can be energized individually or in groups to move the plate longitudinally back and forth so as to locate it in a desired position. The conveyor can be any reasonable width. An alignment mechanism (not illustrated) has pushers movable from the sides toward the center of the conveyor so as to properly position the plate along the centerline of the conveyor. A plurality of cameras, respectively designated 16, 18, 20, and 22, are mounted in fixed positions on a support surface or wall 24 of the building containing the apparatus 10. The cameras are horizontally and vertically spaced from the conveyor 14 so they will not be damaged by materials falling off of the conveyor.

The viewing ranges 26, 28, 30, and 32 of the cameras define the measurement range of the apparatus. As can be seen from FIGS. 1 and 2, the viewing ranges of adjacent cameras overlap to ensure that there are no "dead" spaces within the measurement range. An arbitrary fixed point, such as the centerline 34 of a stationary shear 36, is designated. At least one and preferably two alignment or calibration points, one of which designated 38 is illustrated, are located within the viewing range of each camera. The position of the calibration points are recorded for each camera after calibration of the system is complete. Any fixed point, the fixed shear in this case, is used as a reference point to calibrate all cameras. The portion of the measurement range covered by a camera is calibrated using an elongate piece of material having measuring points spaced along its length at known locations. First, the distance between one of the points and the fixed point is measured and entered into the computer. Then, the location of each of the remaining measuring points is sensed and entered into the computer. The computer automatically assigns values to the regions between the measured points. An operator control station 40 is located in the vicinity of the shear 36.

Figure 4:
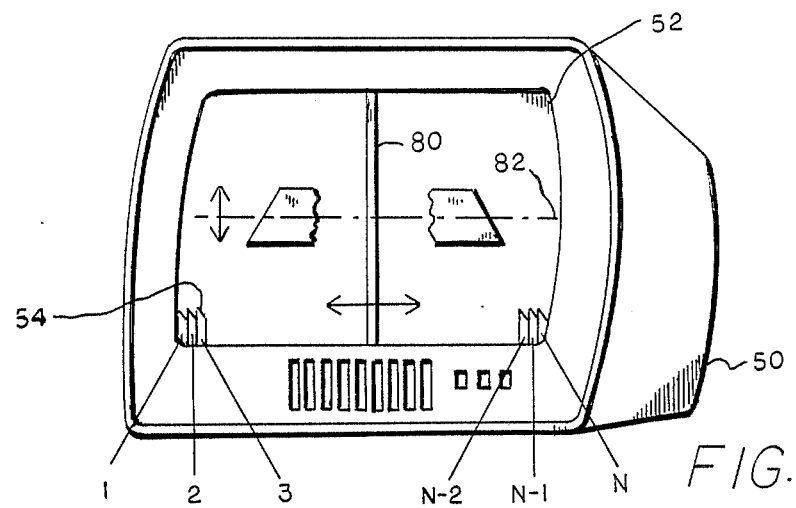
FIG. 4 depicts one example of a display encountered during a measuring operation.
Figure 5:
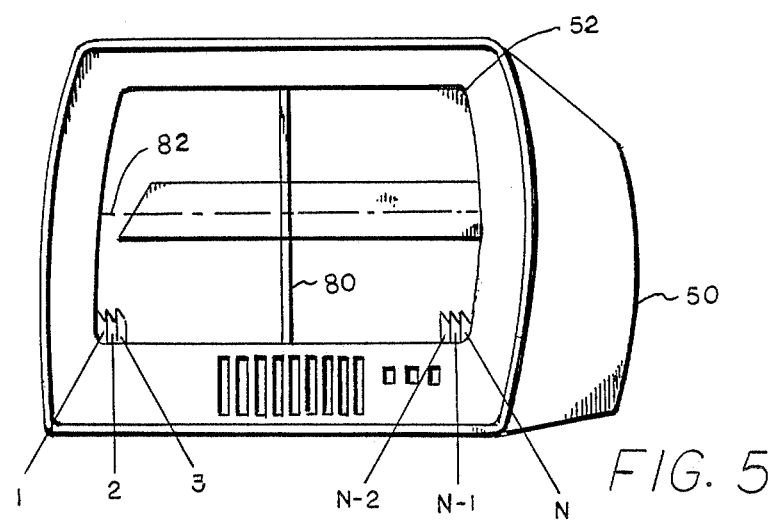
FIG. 5 depicts another example of a display encountered during a measuring operation.
Figure 6:
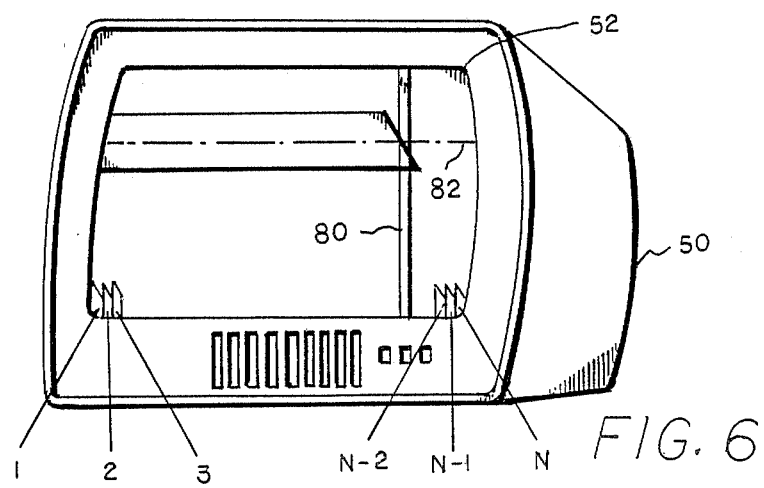
FIG. 6 depicts a third example of a display encountered during a measuring operation.

As best illustrated in FIGS. 4–6, the image depicted on screen 52 of monitor 50 is horizontally divided into a plurality of discrete elements or pixels 54. Each pixel (schematically designated 1, 2, 3...N-2, N-1, N, respectively) corresponds to a discrete portion of the measuring range. By knowing the relationship between a given pixel and the pixel containing the calibration point, it is possible to calculate the exact distance of the given pixel from the fixed point 34. The software used with the system depicts a horizontal line on the screen 52 that represents the centerline of the conveyor. The position of the line on the screen is vertically movable to correct for optical variations because of the location of the viewed object within the cameras field of view. In one embodiment, the screen 52 is divided into 512 pixels. The cameras located to the left of the centerline 34 are fitted with lenses so that the width of each pixel corresponds with 0.6 inches of the measurement range and the cameras to the right of the center line are fitted with lenses so that each pixel represents 0.9 inches of the measurement range. With such an arrangement, it is possible to obtain a higher degree of accuracy to the left of the shear 36 where an end of the plate is located when most plate cuts are made.

Referring now to FIG. 3, one embodiment of a control system, generally designated 60, used with the present invention is depicted.

The system 60, which is preferably contained within the control station 40, includes a central computer 62, an operator control station 64 that has a conventional keyboard control module, motor controls 66 (automatic or manual) for the conveyor 14, an automatic or manual control 68 for the shear 36, the TV monitor 50, and a switch 70 for selecting a particular camera. The control system 60 also includes appropriate memory devices 72 and peripheral devices 74, such as input/output devices, a printer, sensors, and data communication links.

Considering now the operation of the apparatus 10, a piece of material 12 to be measured, such as an aluminum plate from a hot mill, is positioned by the conveyor 14, by appropriate adjustments of the motor control 66, within the measurement range of the apparatus. The operator, using camera switch 70, energizes a selected camera containing an edge or other desired portion of the material within its viewing range. If the edge is aligned with the viewing axis of the camera, it will appear as a straight line. If the edge is positioned to the left of the axis of the camera, it will be angled, as illustrated in FIG. 5. If the edge is positioned to the right of the viewing axis, it will be angled in the opposite direction, as illustrated in FIG. 6. The operator, using control 64, then moves indicator 80 into a position in alignment with the intersection of the edge of the material with the horizontal line representing centerline 82 of the conveyor, as best illustrated in FIG. 6. After the "crosshair" pixel has been aligned with the edge, the operator signals the computer so that the exact location of the edge with respect to the fixed point 34 can be calculated. The computer, using the relationship between the pixel containing the edge and the pixel's known distance from the fixed calibration point, calculates the distance of the edge from the fixed point. The operator then energizes the camera containing the opposite edge of the material and performs a similar measuring operation. If both locations are on the same side of the fixed point, the measured values are subtracted from each other to obtain the overall length of the material. On the other hand, if the determined values are on opposite sides of the fixed point, as in FIG. 4, the values are added to obtain the overall length.

Once the overall length has been obtained, the operator inputs into the computer, either manually or automatically, the desired lengths of materials to be cut from the plate. The computer then calculates the locations of the cuts to be made to obtain the desired lengths. A selected camera is energized and the indicator 80 is positioned on the screen 52 at the desired location of the edge of the material where the first shear is performed. The operator, using conveyor motor control 66, aligns an edge of the material with the pixel and then energizes shear control 68 to perform the shearing operation. When an end of the material is to be sheared, the operator sometimes performs a series of small shearing operations prior to aligning the edge of the material with the pixel. This is required because, in one embodiment, the scrap system associated with the shear can handle only small pieces of scrap.

In one modification of the previously described procedure, the operator initially visually aligns the leading edge of the material to be measured with the calibration point of the apparatus. Such alignment is possible because of the location of the control station 40 adjacent to the shear 36. With this embodiment, after the operator has aligned the leading edge of the piece of material with the centerline of the shear, he then uses the camera switch 70 to energize the camera depicting the trailing edge of the material. Determining the location of the trailing edge then automatically determines the overall length of the piece of material.

One embodiment of the present invention has been used to successfully measure aluminum plate ranging in length between 72 inches and 1,900 inches and ranging in thickness between 0.25 inches and 4.0 inches. Measurement accuracy has been within approximately 2.0 inches. Such accuracy is not adversely affected by variations in the thickness of the plate being measured. This embodiment utilizes six cameras positioned on a wall of the building approximately 30 feet from the center line of a 12-foot wide conveyor and approximately 28 feet above the conveying plane of the conveyor. The conveying plane is approximately 2 feet above floor level. Alignment of the cameras used in this system has been maintained over an extended period of time because the camera mounts were welded to structural portions of the building, despite the harsh environmental conditions associated with processing hot aluminum plate. The cameras used with the system have been adjusted so that the cameras closest to and downstream of the shear have the highest resolution. Overall lengths less than 72 inches can be measured; however, there is no need to measure shorter overall lengths because the shear cannot be used to cut pieces shorter than 72 inches. Pieces longer than 1,900 inches can be measured simply by adding more cameras or by increasing the viewing range of each camera (which will result in decreased accuracy).

The invention, in one embodiment, includes a system for rapidly verifying camera alignment. With this system, easily visible targets are mounted on structural parts of the conveyor in regions where the fields of view of adjacent cameras overlap. Targets also are mounted at the extremities of the measuring range. Each camera can see two targets. The video screen has two additional small cross hairs that, during calibration of a particular camera, are aligned with the targets within the viewing range of the camera. Subsequently, when the particular camera is connected to the video screen, the cross hairs are displayed automatically in the position where the targets should be. If the cross hairs are aligned with the target, the camera is still in alignment with the measuring surface and the calibration, in practice, will be unchanged. If the alignments are in obvious error, the calibration will be inaccurate and will need to be corrected by realigning the offending camera and rechecking the calibration.

While the invention has been described with reference to certain specific embodiments thereof, it is not intended to be limited thereby. Rather it is the intention that the present invention be limited only by the appended claims.

What is claimed is:

1. A non-contact length measuring apparatus for measuring a dimension of an elongate piece of material comprising:
   conveying means for positioning an edge of material to be measured within a measuring range of the apparatus;
   a plurality of cameras spaced from the conveying means, each camera being rigidly mounted in a fixed position and having a viewing range defining a portion of the measuring range of the apparatus;
   calibration means for calibrating the viewing range of each camera so that each viewing range covers a portion of the measuring range that has a known spatial relationship with a fixed point;
   display means for displaying any selected camera view which depicts at least a portion of the viewing range;
   edge detecting means operably associatable with said display means, said edge detecting means having indicator means for indicating on the display means the position of a displayed edge of a piece of material, and means for calculating the exact location of the edge with respect to the fixed point; and
   alignment means operable by an operator of the apparatus for aligning said indicator means of said edge detecting means with a displayed edge of a piece of material, the operator using said alignment means to align said indicator means with an edge of the material to be measured, said means for calculating using the position of the indicator means to determine the distance between the displayed edge and the fixed point.

2. A non-contact measuring apparatus for measuring an elongate piece of aluminum comprising:

conveying means for positioning an edge of aluminum to be measured within a measuring range of the apparatus;

a plurality of video cameras horizontally and vertically spaced from the conveying means, each camera having a viewing range defining a portion of the measuring range of the apparatus;

calibration means for calibrating the viewing range of each camera so that each viewing range covers a known length portion of the viewing range that has a known spatial relationship with a fixed point;

display means for displaying at least a portion of the viewing range of a selected camera;

edge detecting means operably associatable with said display means, said edge detecting means having indicator means for indicating on the display means the position of an edge of a piece of aluminum, and means for calculating the exact location of the edge with respect to the fixed point; and alignment means operable by an operator of the apparatus for aligning said indicator means of said edge detecting means with a displayed edge of aluminum to be measured, the operator using said alignment means to align the indicator means with the edge, said calculating means using the position of the indicator means to determine the distance between the edge and the fixed point.

3. The apparatus of claim 2, further comprising means for mounting each of said cameras in a fixed position with respect to the conveying means.

4. The apparatus of claim 2, wherein said calibration means includes a plurality of calibration points located along the the conveying means, each viewing range including at least one calibration point, each calibration point being located a known distance from the fixed point.

5. The apparatus of claim 2, wherein at least two of the viewing ranges of adjacent cameras overlap.

6. The apparatus of claim 2, wherein the viewing ranges of adjacent cameras overlap.

7. The apparatus of claim 2, wherein the fixed point is located within the measuring range.

8. The apparatus of claim 2, wherein the measuring range is selected to be longer than the longest piece of aluminum to be measured.

9. The apparatus of claim 2, wherein the display means comprises a video screen and means for selectively connecting one of said cameras to said video screen.

10. A method using a non-contact measuring apparatus to measure a dimension of a piece of material, the apparatus having a plurality of cameras whose viewing ranges define the measuring range of the apparatus, each viewing range being calibrated to measure a known length portion of the measuring range having a known spatial relationship with a fixed point, means for displaying the viewing range of a selected camera, edge detecting means operably associatable with each camera and having indicator means for indicating the displayed edge of a piece of material and means for calculating the location of the edge with respect to the fixed point, and alignment means for moving the indicator means, said method comprising:

positioning material to be measured within the measuring range of the apparatus, selecting one of said cameras having an edge of the material within its viewing range, connecting the selected camera to the display means, and using the alignment means to move the indicator means into alignment with the displayed edge of the material, the means for calculating determining the distance of the edge from the fixed point based on the position of the indicator means.

11. The method of claim 10, further comprising manually manipulating the alignment means to move the indicator means into alignment with the displayed edge.

12. The method of claim 10, further comprising placing one edge of the material to be measured at the fixed point and thereafter selecting the camera having the opposite edge of the material within the viewing range.

13. The method of claim 10, further comprising positioning indicator means a desired distance from the fixed point, and moving an edge of the material into alignment with the indicator means to thereby position the edge or desired distance from the fixed point.

* * * * *